US009043194B2

(12) United States Patent
Nair et al.

(10) Patent No.: US 9,043,194 B2
(45) Date of Patent: May 26, 2015

(54) METHOD AND SYSTEM FOR EFFICIENT EMULATION OF MULTIPROCESSOR MEMORY CONSISTENCY

(75) Inventors: Ravi Nair, Briarcliff Manor, NY (US); John Kevin O'Brien, South Salem, NY (US); Kathryn Mary O'Brien, South Salem, NY (US); Peter Howland Oden, Ossining, NY (US); Daniel Arthur Prener, Croton-on-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 1563 days.

(21) Appl. No.: 10/244,434

(22) Filed: Sep. 17, 2002

(65) Prior Publication Data
US 2004/0078186 A1 Apr. 22, 2004

(51) Int. Cl.
*G06F 9/455* (2006.01)
*G06F 12/10* (2006.01)

(52) U.S. Cl.
CPC ........ *G06F 12/1072* (2013.01); *G06F 12/1027* (2013.01); *G06F 2212/656* (2013.01); *G06F 2212/682* (2013.01)

(58) Field of Classification Search
None
See application file for complete search history.

(56) References Cited

U.S. PATENT DOCUMENTS

| | | |
|---|---|---|
| 4,392,196 A | 7/1983 | Glenn et al. |
| 4,564,903 A | 1/1986 | Guyette et al. |
| 5,055,999 A | 10/1991 | Frank et al. |
| 5,307,477 A | 4/1994 | Taylor et al. |
| 5,388,215 A | 2/1995 | Baker et al. |
| 5,390,309 A | 2/1995 | Onodera |
| 5,440,710 A | 8/1995 | Richter et al. |
| 5,481,684 A | 1/1996 | Richter et al. |
| 5,574,878 A | 11/1996 | Onodera et al. |
| 5,574,922 A * | 11/1996 | James ........................ 712/220 |
| 5,615,327 A | 3/1997 | Magee et al. |
| 5,619,665 A | 4/1997 | Emma |
| 5,668,969 A | 9/1997 | Fitch |
| 5,675,762 A | 10/1997 | Bodin et al. |
| 5,678,032 A | 10/1997 | Woods et al. |
| 5,751,982 A | 5/1998 | Morley |
| 5,761,734 A | 6/1998 | Pfeffer et al. |
| 5,768,593 A | 6/1998 | Walters et al. |
| 5,832,205 A | 11/1998 | Kelly et al. |
| 5,905,998 A * | 5/1999 | Ebrahim et al. .............. 711/144 |
| 5,983,012 A | 11/1999 | Bianchi et al. |
| 6,031,992 A | 2/2000 | Cmelik et al. |

(Continued)

FOREIGN PATENT DOCUMENTS

| | | |
|---|---|---|
| JP | 63-226740 | 9/1988 |
| JP | 07-271738 | 10/1995 |

(Continued)

OTHER PUBLICATIONS

Standards Information Network IEEE Press, IEEE 100 The Authoritative Dictionary of IEEE Standards Terms, 7th Ed., 2000, 5 pages.*

(Continued)

*Primary Examiner* — Suzanne Lo
(74) *Attorney, Agent, or Firm* — Daniel P. Morris; McGinn IP Law Group, PLLC

(57) ABSTRACT

A method (and system) of emulation in a multiprocessor system, includes performing an emulation in which a host multiprocessing system of the multiprocessor system supports a weak consistency model, and the target multiprocessing system of the multiprocessor system supports a strong consistency model.

24 Claims, 10 Drawing Sheets

(56) References Cited

U.S. PATENT DOCUMENTS

| | | | |
|---|---|---|---|
| 6,047,323 A | 4/2000 | Krause | |
| 6,075,937 A | 6/2000 | Scalzi et al. | |
| 6,075,938 A | 6/2000 | Bugnion et al. | |
| 6,091,897 A | 7/2000 | Yates et al. | |
| 6,134,515 A | 10/2000 | Skogby | |
| 6,158,049 A | 12/2000 | Goodwin et al. | |
| 6,189,141 B1 | 2/2001 | Benitez et al. | |
| 6,195,676 B1 | 2/2001 | Spix et al. | |
| 6,240,490 B1 | 5/2001 | Lyles et al. | |
| 6,289,369 B1 | 9/2001 | Sundaresan | |
| 6,289,419 B1 * | 9/2001 | Takahashi | 711/141 |
| 6,339,752 B1 | 1/2002 | Mann et al. | |
| 6,341,371 B1 | 1/2002 | Tandri | |
| 6,345,351 B1 | 2/2002 | Holmberg | |
| 6,351,844 B1 | 2/2002 | Bala | |
| 6,381,682 B2 | 4/2002 | Noel et al. | |
| 6,430,657 B1 * | 8/2002 | Mittal et al. | 711/138 |
| 6,463,582 B1 | 10/2002 | Lethin et al. | |
| 6,480,845 B1 | 11/2002 | Egolf et al. | |
| 6,529,862 B1 | 3/2003 | Mann et al. | |
| 6,539,464 B1 | 3/2003 | Getov | |
| 6,728,950 B2 | 4/2004 | Davis et al. | |
| 6,738,974 B1 | 5/2004 | Nageswaran et al. | |
| 6,763,328 B1 * | 7/2004 | Egolf et al. | 703/27 |
| 6,763,452 B1 | 7/2004 | Hohensee et al. | |
| 6,883,165 B1 | 4/2005 | Blandy et al. | |
| 6,915,513 B2 | 7/2005 | Duesterwald et al. | |
| 6,920,416 B1 | 7/2005 | Swoboda et al. | |
| 6,934,832 B1 | 8/2005 | Van Dyke et al. | |
| 6,961,806 B1 * | 11/2005 | Agesen et al. | 711/6 |
| 6,978,233 B1 | 12/2005 | Burns | |
| 7,047,394 B1 | 5/2006 | Van Dyke et al. | |
| 7,080,366 B2 | 7/2006 | Kramskoy et al. | |
| 7,089,539 B2 | 8/2006 | Dornan et al. | |
| 7,093,231 B2 | 8/2006 | Nuss | |
| 7,134,119 B2 | 11/2006 | Nevill | |
| 7,275,028 B2 | 9/2007 | Traut | |
| 7,735,073 B1 | 6/2010 | Kosche et al. | |
| 8,065,504 B2 | 11/2011 | Yates et al. | |
| 8,121,828 B2 | 2/2012 | Yates et al. | |
| 8,146,063 B2 | 3/2012 | Lindwer et al. | |
| 2001/0020224 A1 | 9/2001 | Tomita | |
| 2002/0019969 A1 | 2/2002 | Hellestrand et al. | |
| 2002/0026304 A1 | 2/2002 | Deao et al. | |
| 2002/0066086 A1 | 5/2002 | Linden | |
| 2002/0082823 A1 | 6/2002 | Traut | |
| 2002/0083278 A1 | 6/2002 | Noyes | |
| 2002/0104075 A1 | 8/2002 | Bala et al. | |
| 2002/0144081 A1 | 10/2002 | Willis et al. | |
| 2002/0147969 A1 | 10/2002 | Lethin et al. | |
| 2002/0199172 A1 | 12/2002 | Bunnell | |
| 2003/0093780 A1 | 5/2003 | Freudenberger et al. | |
| 2003/0171907 A1 | 9/2003 | Gal-On et al. | |
| 2003/0182653 A1 | 9/2003 | Desoli et al. | |
| 2003/0196142 A1 | 10/2003 | Brooks | |
| 2004/0015888 A1 | 1/2004 | Fujii et al. | |
| 2004/0019886 A1 | 1/2004 | Berent et al. | |
| 2009/0204785 A1 | 8/2009 | Yates et al. | |

FOREIGN PATENT DOCUMENTS

| | | |
|---|---|---|
| JP | 08-087424 A | 4/1996 |
| JP | 08-234981 | 9/1996 |
| JP | 08-272686 | 10/1996 |
| JP | 08-272686 A | 10/1996 |
| JP | 11-134307 | 5/1999 |
| JP | 11-259437 | 9/1999 |
| WO | WO 95/16967 | 6/1995 |
| WO | WO 99/03037 A1 | 1/1999 |
| WO | WO 99/44131 | 9/1999 |

OTHER PUBLICATIONS

Wikipedia entries and revision histories of "Memory coherence", "Consistency model", "Weak consistency", "Emulator", "Virtual machines", and "Simulation", http://en.wikipedia.org, accessed Feb. 21, 2007, 21 pages.*

Department of Defense, "DoD Modeling and Simulation (M&S) Glossary", Jan. 1998, 175 pages.*

Lee, Jaejin "Hiding the Java Memory Model with Compilers", 2000, 8 pages.*

Lee et al. "Hiding Relaxed Memory Consistency with a Compiler", Aug. 2001, IEEE Transactions on Computers, vol. 50, No. 8, pp. 824-833.*

Raina, Sanjay "Emulation of a Virtual Shared Memory Architecture" Sep. 1993, Thesis, 199 pages.*

Turley, J., "Alpha Runs x86 Code with FX!32", Microprocessor Report, Mar. 5, 1996.

May, C., "Mimic: A Fast System/370 Simulator", Proceedings of the Object Oriented Programming Systems Languages and Applications Conference (OOPSLA), Orlando, FL, Oct. 4-8, 1987, special Issue of Sigplan Notices, Dec. 1987, vol. 22, No. 7, Jun. 24.

Magnusson, P.S., "A Design for Efficient Simulation of a Multiprocessor", Proceedings of the First International Workshop on Modeling, Analysis, and Simulation of Computer and Telecommunication Systems (MASCOTS), La Jolla, CA Jan. 1993, pp. 69-78.

Lamport, L., "How to Make a Multiprocessor Computer that Correctly Executes Multiprocess Programs", IEEE Transactions on Computers, C-28, Sep. 9, 1979, pp. 690-691.

Adve, S., et al., "Shared Memory Consistency Models: A Tutorial", IEEE Computer, vol. 29, No. 12, Dec. 1996, pp. 66-76.

Herrod, S.A., "Using Complete Machine Simulation to Understand Computer System Behavior", Ph.D. Thesis, Stanford University, Feb. 1998.

Nichols, B., et al., "Pthreads Programming: A POSIX Standard for Better Multiprocessing" (O'Reilly Nutshell), Sep. 1996.

"A framework for remote dynamic program optimization", M. J. Voss and R. Eigenmann, Proceedings of the ACM SIGPLAN workshop on Dynamic and adaptive compilation and optimization table of contents pp. 32-40, 2000, pp. 32-40, ISBN: 1-58113-241-7.

"Using Annotation to Reduce Dynamic Optimiation Time", C. Krintz and B. Calder, 2001 ACM ISBN-158113-414-2/01/06, pp. 156-167.

"Prototype Real-Time Monitor: Design" R. Van Scoy et al., Technical Report CMU/SEI-87-TR-038 ESD-TR-87-201, Nov. 1987.

Bala, V., et al., "Dynamo: A Transparent Dynamic Optimization System", Conference on Programming Language Design and Implementation, 2000, pp. 1-12.

Burke M.G., et al., "The Jalapeno Dynamic Optimizing Compiler for JavaTM", IBM Thomas J. Watson Research Center Technical Paper, Mar. 1999, 13 pages. (published 1999 ACM Java Grande Conference Proceedings, San Francisco, CA, Jun. 12-14, 1999).

Ball, T., et al., "Efficient Path Profiling", IEEE Proceedings of MICRO-29, Dec. 2-4, 1996, pp. 1-12.

"Java Multihreading" David Nelson-Gal et al., Jun. 1, 1998, Java Developer's Journal, pp. 1-4, http://jdj.sys-con.com/read/35997,htm.

Japanese Office Action dated Nov. 1, 2005.

IBM, "Low-Synchronization Translation Lookaside Buffer Consistency Algorithm" (ID NB9011428), IBM Technical Disclosure Bulletin, Nov. 1990 vol. 33 Issue 6B p. 428-433.

Hoogerbrugge et al., "Pipelined Java Virtual Machine Interpreters", 2000 (15 pages).

University of Queensland, "The University of Queensland Binary Translator (UQBT) Framework", 2001, 326 page (34 pages extracted). Online version can be obtained at <www.experimentalstuff.com/Technologies/uqbt/uqbt.pdf>.

Julian Brown, "ARMphetamine—A Dynamically Recompiling ARM Emulator", May 2000, 97 pages (36 pages extracted). Online version can be obtained at <http://armphetamine.sourceforge.net/diss.ps>.

"Computer Dictionary", Third Edition, Microsoft Press, 1997, excerpts including p. 467.

United States Notice of Allowance dated Jun. 25, 2013 in U.S. Appl. No. 13/311,858.

Ung et al., Machine-adaptable dynamic binary translation, Jan. 2000, 11 pages.

Cifuentes et al., Experience in the design, implementation and use of a retargetable static binary translation framework, Jan. 2002, 59 pages.

(56) References Cited

OTHER PUBLICATIONS

United States Office Action dated Apr. 9, 2013 in U.S. Appl. No. 13/085,873.

Rosenburg, Bryan. Low-synchronization translation lookaside buffer consistency in large-scale shared-memory multiprocessors., 1989. ,vol. 23. No. 5., ACM, pp. 137-146.

Lai et al.; Load balancing in distributed shared memory systems; IPCCC 1997., IEEE International; pp. 152-158.

Liang et al.; An effective selection policy for load balancing in software DSM; Parallel Processing, 2000. Proceedings.2000 International Conference on Aug. 2000 pp. 105-112.

\* cited by examiner

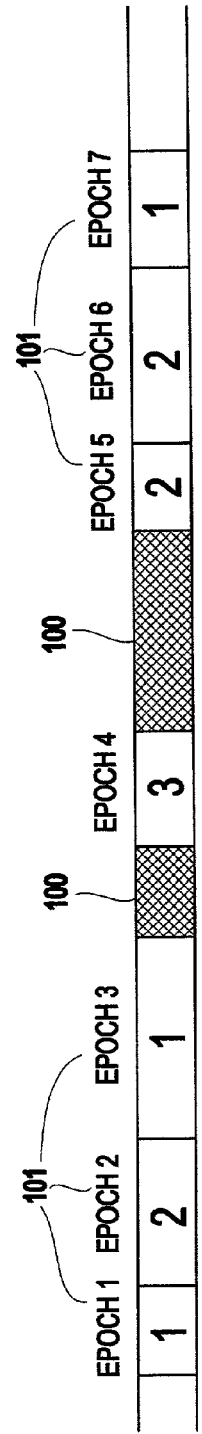

SHARED MEMORY — 410

CACHE FOR PROC. 1 — 420A (... y ...)
CACHE FOR PROC. 2 — 420B (... x ...)

PROCESSOR 1 — 430A
PROCESSOR 2 — 430B

| VALIDITY/ STATUS BITS | PROCESS ID | VIRTUAL ADDRESS | REAL ADDRESS | PROTECTION BITS | LOOKASIDE MASK | READ/WRITE MASK | MODE OF ACCESS |
|---|---|---|---|---|---|---|---|
| 510 | 520 | 530 | 540 | 550 | 560 | 570 | 580 |
| | | | | | 01100010 | 00100000 | Sh. Write |
| | | | | | 00010000 | 00000000 | Ex. Read |
| | | | | | 00100000 | 00100000 | Ex. Write |
| | | | | | 00100110 | 00000000 | Sh. Read |

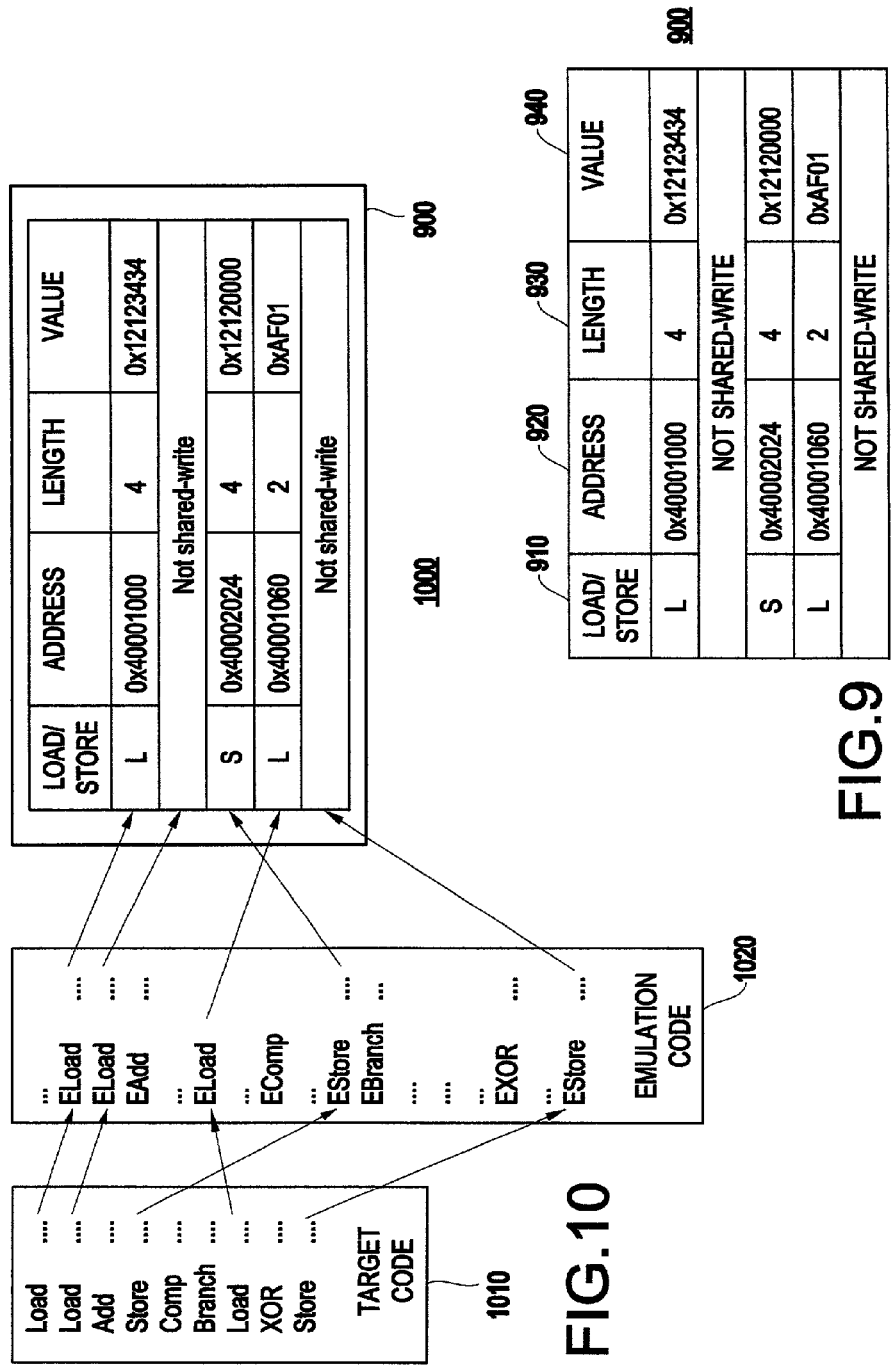

METHOD AND SYSTEM FOR EFFICIENT EMULATION OF MULTIPROCESSOR MEMORY CONSISTENCY

CROSS-REFERENCE TO RELATED APPLICATIONS

The present application is related to U.S. patent application Ser. No. 10/244,414, filed on Sep. 17, 2002, to Altman et al., entitled "METHOD AND SYSTEM FOR MULTIPROCESSOR EMULATION ON A MULTIPROCESSOR HOST SYSTEM" having IBM Docket No. YOR920010533US1, to U.S. patent application Ser. No. 10/244,682, filed on Sep. 17, 2002, to Nair et al., entitled "HYBRID MECHANISM FOR MORE EFFICIENT EMULATION AND METHOD THEREFOR" having IBM Docket No. YOR920010534US1, to U.S. patent application Ser. No. 10/244,559, filed on Sep. 17, 2004, to Nair et al., entitled "METHOD AND SYSTEM FOR EFFICIENT EMULATION OF MULTIPROCESSOR ADDRESS TRANSLATION ON A MULTIPROCESSOR HOST" having IBM Docket No. YOR920010535US1, and to U.S. patent application Ser. No. 10/244,564, filed on Sep. 17, 2004. to Nair et al., entitled "METHOD AND SYSTEM FOR TRANSPARENT DYNAMIC OPTIMIZATION IN A MULTIPROCESSING ENVIRONMENT" having IBM Docket No. YOR920020056US1, each assigned to the present assignee, and incorporated herein by reference.

BACKGROUND OF THE INVENTION

1. Field of the Invention

The present invention generally relates to computer systems, and in particular to a method for emulating the memory sharing behavior of a multiprocessing computer system on another multiprocessing computing system with an intrinsically different memory sharing behavior.

2. Description of the Related Art

A major motivation for emulation, is to allow systems written for a particular architecture, to execute on another architecture, with a minimum loss of performance. Clearly then, the efficiency of the emulation process and the quality of the resulting "host" code sequence are of paramount importance.

Typically, a computing system includes several portions, including the processors, the memory, and the input/output devices. It is often necessary to emulate the behavior of one computing system on another. One of the principal reasons for emulation is to enable programs written for a system (e.g., the "target computing system"), to perform with the same results on another system (e.g., the "host computing system").

Several conventional techniques have been developed to emulate the instruction set of one processor using the instruction set of another processor (e.g., SIMOS as disclosed by Stephen A. Herrod,"Using Complete Machine Simulation to Understand Computer System Behavior," Ph.D. Thesis, Stanford University, February 1998; or MIMIC as disclosed in Cathy May, "Mimic: A Fast System/370 Simulator", Proceedings of the Object Oriented Programming Systems Languages and Applications Conference, (OOPSLA), Orlando, Oct. 4-8, 1987, Special Issue of Sigplan Notices, vol. 22, No. 12, December 1987, vol. 22, No. 7, June 24).

To perform the emulation faithfully, it is necessary also to emulate the behavior of memory in such a system. Typically, the behavior includes more than reading and writing locations in memory with program-specified addresses.

More particularly, when the contents of some location are changed by a processor in a multiprocessing system, the rules governing when the change should be observed by all processors in the system are well-defined in the architecture. In this respect, most systems today behave almost identically when there is only one processor in the system. That is, the systems enforce program order, which simply means that if a statement S1 precedes another statement S2 in the sequence of instructions presented in a program, the processor must behave as though S1 completes its execution before S2 begins its execution. This implies that S2 must know of changes made by S1 to any resource, including registers and memory.

Therefore, if a multiprocessing system is emulated on a uniprocessing system as in the above-mentioned SimOS and SimICS tchniques, and if both the target system and host system obey program order, the memory accesses during emulation can be viewed as a series of epochs 101, each epoch 101 representing a processor in the target system, as shown in FIG. 1. That is the number in the area indicates the identification of an emulated processor, whereas the shaded areas 100 indicate that the system was performing other functions.

Since there is no simultaneous interaction between the emulated memory accesses of two or more processors during an epoch 101, program order can be guaranteed by simply performing a correct uniprocessor emulation of a target processor on the host processor.

Hence, in FIG. 1, when one is attempting to emulate multiple processors on a single processor, then interleaving occurs of the different multiprocessors at different times. Thus, processor 1 will be emulated at a certain time, and then processor 2 is emulated for a while, and then the emulation goes back to emulation of processor 1 for a time, and then there is a time (e.g., shaded area 100) when no emulation occurs, but the single processor is performing other functions. Thus, the single processor at a given time, is performing emulation of only one of the processors of the multiprocessors, not all of the processors.

The above interleaving operation is extremely inefficient. However, an advantage is that it is impossible that the "critical section" of one processor is interleaved with a critical section of another processor. That is, a "critical section" is a section which cannot be entered at the same time by two processors.

On a uniprocessor, one does not have to do much (e.g., nothing special) when performing the emulation, since the critical section will never be entered by two processors at the same time. In a sense, the uniprocessor automatically satisfies the condition that the critical section will not be entered by two processors simultaneously. By the same token, the situation changes dramatically when trying to emulate the processors on a multiprocessing system. That is, problems may arise.

For example, FIG. 2 illustrates an application of Dekker's algorithm in which there is an example of sharing between processors 201 and 202. In the example of FIG. 2, two processors 201, 202 are attempting to access a critical section. Again, in a uniprocessor, the accessing of a critical section (e.g., one in which only one processor can enter at a time) does not become problematic (e.g., automatically overcome by the uniprocessor), since the uniprocessor operation is sequential through the use of the epochs shown in FIG. 1.

Hence, if a program was implemented which used Dekker's algorithm and it was being run on a multiprocessing machine and emulation was being performed on a uniprocessor, then there would be no problem. However, if the same program using Dekker's algorithm was being run on a target machine and the target machine was being emulated by the multiprocessing system, then there would be a problem. Dekker's algorithm should be viewed as though it were running on processor 201, 202 as the target processor 201, 202.

Specifically, the first processor 201 sets a variable x and then ensures that the other processor 202 has not set its own variable y before getting into the critical section. The second processor 202 sets y and ensures that x is not set before progressing into the critical section. There are several ways in which the entire application can play out when emulated on a uniprocessor, two of which are shown in FIG. 3. As noted, Order 1 for P1 is performed until the epoch change at which time P2 is emulated. Thus, in the two-processor order of FIG. 3, whenever there is an epoch change, emulation switches to the other processor, and it is clear that when one processor (e.g., P1) is in the critical section, the other processor (P2) cannot enter the critical section.

However, it is impossible for the critical section of one processor to be interleaved with the critical section of the second processor since this would imply that the host processor sees (x=1; y=0) at one time and (x=0; y=1) at another without a write having occurred in between.

FIG. 4 illustrates a situation that could lead to incorrect behavior of the method/Dekker's algorithm of FIG. 2. System 400 of FIG. 4 includes a shared memory 410, as well as caches 420A, 420B respectively provided for first and second processors 430A, 430B. Hence, in the situation of FIG. 4, both processors could be executing in the critical section at the same time, thereby causing problems.

That is, suppose that the target system has a consistency model that ensures that this situation can never happen (e.g., by waiting after stores to memory until an acknowledgment is received from other processors). Examples of such systems include the IBM System/390® and the Intel x86®.

Also suppose that the host system, in an attempt to make its implementation relatively fast, has a more relaxed consistency model and does not guarantee atomic recording of writes to memory. Incorrect behavior may therefore result when the example above is emulated by such a host system.

Systems which have such relaxed consistency models like the PowerPC®, invariably offer special synchronizing instructions, or memory barrier instructions that ensure that results of memory actions before the instruction are guaranteed to have been seen by all processors before seeing the results of later instructions.

Thus, one way to ensure that the simulation is done correctly is to follow every memory instruction with a memory barrier instruction. Unfortunately, such instructions take several cycles to complete. Moreover, memory instructions (e.g., loads and stores from and to memory) are quite frequent (e.g., oftentimes as many as a third of all instructions).

It therefore becomes desirable to find a solution to the above problem. Further, it becomes desirable to minimize the cost of emulating the memory consistency behavior of a multiprocessing system on another multiprocessing system, especially when the host multiprocessing system supports a "weaker" (more relaxed) consistency model compared to the target multiprocessing system (more stringent or "strong"). It is noted that the terms "weaker" (or "relaxed") and "strong" are believed to be well-known to those of ordinary skill in the art (e.g., see Sarita Adve et al., "Shared Memory Consistency Models: A Tutorial," IEEE Computer, vol. 29, no. 12, December 1996, pp. 66-76, and L. Lamport, "How to Make a Multiprocessor Computer That Correctly Executes Multiprocess Programs," IEEE Transactions on Computers, C-28, 9, September 1979, pp. 690-691).

Thus, in the conventional emulation methods and techniques, various levels of translation may be employed to enhance the performance of the host instructions produced by the emulator. However, notwithstanding all the current techniques, there remains much room for improvement.

Hence, in the conventional techniques and prior to the present invention, there has been no method and apparatus for emulating memory consistency of one system on another system, especially when the host is supporting the above-mentioned relaxed consistency model and the target system uses a strong consistency model.

SUMMARY OF THE INVENTION

In view of the foregoing and other problems, drawbacks, and disadvantages of the conventional methods and structures, an object of the present invention is to provide a method and structure for effectively emulating the memory consistency behavior of a multiprocessing system on another multiprocessing system when the host multiprocessing system supports a relaxed consistency model, while the target multiprocessing system specifies a strong consistency model.

In a first aspect of the present invention, a method (and system) of emulation in a multiprocessor system, includes performing an emulation in which a host multiprocessing system of the multiprocessor system supports a weak consistency model, and the target multiprocessing system of the multiprocessor system supports a strong consistency model.

In a second aspect of the present invention, in a multiprocessor computing system including an emulator for emulating a behavior of a target multiprocessor computing system, a method for emulating a memory consistency behavior of the target multiprocessor computing system, includes executing, prior to a memory action, a memory barrier instruction, the memory barrier instruction ensuring that results of memory actions performed before execution of the memory barrier instruction have been obtained by all processors in a host computing system, wherein the host computing system of said multiprocessor computing system supports a weak consistency model, and the target multiprocessing system of the multiprocessor system supports a strong consistency model.

In a third aspect of the present invention, a method (and system) of efficient emulation of multiprocessor memory consistency, includes forming a memory barrier instruction which ensures that memory actions that have been performed before execution of the memory barrier instruction, have been registered by all of the processors in a host computing system, wherein the host multiprocessing system supports a relaxed consistency model, and the target multiprocessing system specifies a strong consistency model.

In a fourth aspect of the present invention, a method (and system) of ensuring memory consistency in a multiprocessing system, includes determining whether an instruction is a load or a store, if it is determined that the instruction is a load or a store, then resolving an address of the instruction and determining whether the address is stored in a local look-aside buffer (LLB), if the address is in the LLB, then determining whether the location is in a shared-read state, and if it is determined that the location is in a shared-read state, then determining whether the current address is a write, wherein if the current address is not a write, then performing the emulation of the instruction.

In a fifth aspect of the present invention, a method (and system) of inserting code for maintaining consistency within a group of instructions in a multiprocessor system, includes determining whether the instruction is a load or a store, if it is determined that the instruction is a load or a store, then resolving the address, and determining whether the address is in the local look-aside buffer (LLB), if the address is in the LLB, then determining whether the location is in a shared-read state, if it is determined that the location is in a shared-read state, then determining whether the current accesses is a write, if the current access is determined to be a write, then setting the location to a shared-write and determining whether the current access is a load instruction, if it is determined that the current access is a load, then performing a load and determining whether the load is satisfied from a memory order buffer (MOB) table, and if the load is not satisfied from the MOB table, then inserting a corresponding entry into the MOB table indexed by a memory sequence number.

In a sixth aspect of the present invention, a method (and system) of committing shared writes to memory at an end of group execution of instructions, includes at an end of translation, adding a stub code which checks to ensure that no other processor has changed values to "shared-write" locations accessed by a block.

In a seventh aspect of the present invention, a storage reference table (SRT) for a shared multiprocessor system, includes a table constructed which contains as many entries as a number of store references, and wherein each entry contains a plurality of fields including an address field and an old-value field for storing original values for recovery, wherein the table stores information concerning a shared write status of the entries.

In an eighth aspect of the present invention, a memory order buffer (MOB) for a shared multiprocessor system, includes a table maintained with sharing information about locations currently being referenced, wherein the information includes information distinguishing whether a particular state of an entry comprises a shared write state.

In a ninth aspect of the present invention, a system for emulation in a multiprocessor system, includes an emulator for performing an emulation in which a host multiprocessing system of the multiprocessor system supports a weak consistency model, and the target multiprocessing system of the multiprocessor system supports a strong consistency model.

In a tenth aspect of the present invention, a signal-bearing medium is provided tangibly embodying a program of machine-readable instructions executable by a digital processing apparatus to perform a method of emulation in a multiprocessor system, the method including performing an emulation in which a host multiprocessing system of the multiprocessor system supports a weak consistency model, and the target multiprocessing system of the multiprocessor system supports a strong consistency model.

With the unique and unobvious aspects of the present invention, emulation can be efficiently performed of a critical section by a plurality of processors being emulated on a multiprocessing system. That is, the invention is directed to emulating the processors entering the critical sections when such sections are being emulated at the same time for different processors. Again, in the past, such a problem has not been encountered since emulation has been traditionally performed on a uniprocessor. In this regard, the present inventors were the first to recognize such a problem and come up with a unique and unobvious solution.

To ensure the above-mentioned memory consistency, in a first embodiment, the present invention provides a memory barrier instruction which ensures that memory actions that have been performed before execution of the memory barrier instruction, have been accessed (e.g., registered) by all of the processors in the host. This ensures that memory consistency is achieved, since the processors have had the opportunity to register such memory actions/operations.

It is noted that the present invention is most concerned with the "shared write" state.

BRIEF DESCRIPTION OF THE DRAWINGS

The foregoing and other purposes, aspects and advantages will be better understood from the following detailed description of a preferred embodiment of the invention with reference to the drawings, in which:

FIG. 1 illustrates epochs 101 in a uniprocessor emulation of a multiprocessor system;

FIG. 2 illustrates an example of Dekker's algorithm being implemented in a program run by first and second processors 201, 202;

FIG. 3 illustrates an example of two sample orders of emulation on a uniprocessor for the program in FIG. 2;

FIG. 4 illustrates a situation in a system 400 that could lead to incorrect behavior of the algorithm in FIG. 2;

FIG. 5 illustrates a read/write mask field 570 in a global page table entry 500;

FIG. 9 illustrates a memory-order buffer (MOB) 900;

FIG. 10 illustrates a mapping 1000 of a shared memory access to the memory order buffer 900 of FIG. 9;

DETAILED DESCRIPTION OF PREFERRED EMBODIMENTS OF THE INVENTION

Figure 6:
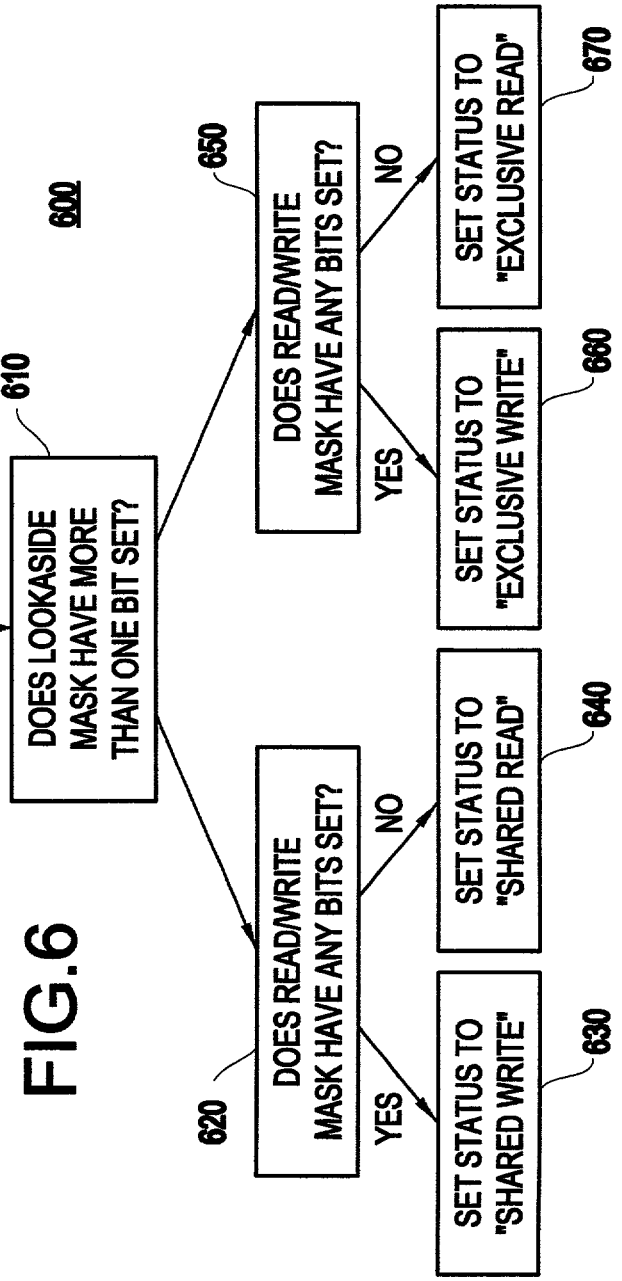
FIG. 6 illustrates a procedure 600 for determining a sharing status of a page.

Referring now to the drawings, and more particularly to FIGS. 5-15, there are shown preferred embodiments of the method and structures according to the present invention.

Preferred Embodiment

For purposes of this discussion, it assumed that the target multiprocessing system supports sequential consistency. This is a stronger form of consistency than is supported by most known systems. Sequential consistency was defined by Lamport (L. Lamport, "How to Make a Multiprocessor Computer That Correctly Executes Multiprocess Programs," IEEE Transactions on Computers, C-28, 9, September 1979, pp. 690-691) to imply that the result of any execution is the same as if the operations of all the processors were executed in some sequential order, and the operations of each individual processor appear in the order specified by its program.

It is also assumed that the host multiprocessing system supports weak consistency (RCsc as defined in the above-mentioned article by Adve et al) but with memory coherence (e.g., memory coherence implies that the order of changes made to a single location is the same when viewed by any processor).

In addition, the existence of a memory barrier instruction, mbar, is assumed which serves to guarantee that all memory operations after the barrier are performed after all memory operations before the barrier as seen (e.g., registered) by all processors.

Sequential consistency can be guaranteed by following every instruction that accesses memory with an mbar instruction. As mentioned earlier, synchronizing instructions typically take multiple cycles, and should be avoided if possible.

A first observation is that not all memory locations are shared between processors. Thus, it would greatly reduce the cost of maintaining sequential consistency if it could be determined with certainty whether a given location is shared or not.

In the case of cached emulation of a system, it is not sufficient to learn the sharing behavior during translation because (a) the address referenced by an instruction may change at each execution of the translation, and (b) an address may change its sharing status during the course of execution. Hereinbelow is described a mechanism that determines the shared nature of the location dynamically.

A table is preferably maintained with sharing information about the locations currently being referenced. To reduce the size of the table, locations are grouped together. One convenient grouping is a page unit, though other, possibly smaller, units can be defined. The page unit is convenient because it is also the unit of protection and mapping information in the page table and in the local lookaside buffer (LLB) as described in the above-mentioned U.S. patent application Ser. No. 10/244,564, incorporated herein by reference and having IBM Docket No. YOR920010535US1. Each page is in one of five states listed below:

1. Not mapped
2. Exclusive read
3. Exclusive write
4. Shared read
5. Shared write Before a page is brought in, or after it is flushed out of the page table, it will be in the "not mapped" state. The page gets brought in when some processor requests it either for reading or for writing. Therefore, the page comes into existence in the page table either as an "exclusive read" or as an "exclusive write."

Associated with each page table entry is a list of processors that have the page listed in their local lookaside buffer (LLB), as described in the above- mentioned U.S. patent application Ser. No. 10/244,564, incorporated herein by reference and having IBM Docket No. YOR920010535US1.

This information is in the lookaside mask field where, for example, a 1 in the fifth position indicates that the fifth processor has this page in its LLB. This description is modified, as shown in the table 500 of FIG. 5, to include information on whether the page is accessed by a processor in a read mode or in a write mode.

The table 500 includes a validity/status bit field 510, a process identification field 520, a virtual address field 530, a real address field 540, a protection bit field 550, a look-aside mask field 560, a read/write mask field 570, and a mode of access field 580.

At some later time, if a processor wants to access a page that is not in its LLB, but is mapped in the page table 500, then that processor is added to this list (e.g., at processor ID field 520) and its mode of access (e.g., field 580) is specified.

At this point, the state of the page is changed to "shared read" if all processors accessing the page have access to it only in the read mode. If even one processor has write access to the page, then the page is set to a "shared write" mode. This procedure is described in the flowchart of FIG. 6.

Thus, as described above, it is suggested why a page having the "shared write" state is a primary focus which the invention must consider.

Further, as mentioned above, certain exemplary assumptions have been made by the invention such as the target system supports "sequential consistency" ("strong") and that the host supports "weak" consistency, etc.

However, this is merely exemplary and certainly the invention is not limited thereto. Indeed, it is noted that the invention supports a number of different combinations and permutations of "strong" and "weak" consistencies. However, the inventors have recognized that the hardest case is a "strong" on "weak" scenario, and thus this is discussed primarily herein. The other cases (e.g., "strong" on "strong", "weak" on "weak", "strong" on "weak", etc.) will operate similarly, but more easily.

That is, trying to emulate a system having "strong" consistency on a system which supports "weak" consistency is the most difficult emulation case. To give a simplistic example of why it is the most difficult case, consider a blackboard in which different people are writing into the blackboard. In a "strong" consistency case, when one person is reading, then the person should be able to see everything that everyone else already has written. Similarly, when another person is writing, then that person ensures that everyone else has finished writing before the person begins writing. This is termed "strong" consistency in which a strong order is maintained in the reads and writes to the blackboard.

In a "weak" consistency (or "release" consistency) case, each person is allowed to write and read whenever that person wishes to do so. In this regard, the person need not ensure that other people have already read (or written it) before he changes it. In such a case, it is the responsibility of some "teacher" (e.g., some program in the instant case) to make sure that where the person needs to read it, the person has in fact already read it before another person starts writing it back again (e.g., changing what is written). This is a more chaotic situation as people continue reading and writing. Many conventional processors today employ such a "weak" consistency model since it allows processors to go much faster than when sharing. Thus, from a performance point of view, the "weak" consistency model is a much better model when there is not much sharing.

Hence, some new machines are implementing such a model and mode of operation. In contrast, older conventional machines have implemented a strong consistency where the operations are sequential (step-by-step).

Thus, as can be expected, it is very difficult to take a very orderly mode of operation ("strong") and apply it to a relatively disorderly operation (e.g., "weak"). In contrast, taking a very disorderly mode of operation ("weak") and applying it to an orderly operation (e.g., "strong") is easier because one is simply providing more order.

Thus, the "shared write" state is of most concern. When a page is brought into the system, the system wants to determine what state the page has. When the page has a "shared write" state, then such a state is flagged, as determined and shown in the read/write mask field 570 in table 500. That is, the read/write mask allows one to identify whether the page is a "shared write" or not. It is noted that the mode of access field 580 is not a field which really exists in the table 500 of FIG. 5. It is shown only for the reader's clarity and, understanding and merely describes that one can determine a shared write state by looking at the combination of the lookaside mask 560 and the read/write mask 570.

Hence, returning to FIG. 6, the method 600 is directed to a procedure for determining sharing status of a page. That is, FIG. 6 shows a technique for determining the last column (e.g., field 580) in table 500 by essentially looking at the look-aside mask and read/write mask, and determining bit positions etc. to obtain a state.

More specifically, in step 610, it is determined whether the look-aside mask has more than one bit set.

If it is determined that the lookaside mask has more than one bit set (e.g., a "YES") in step 610, then in step 620 it is determined whether the read/write mask has any bits set.

If it is determined that the read/write mask has bit(s) set (e.g., a "YES") in step 620, then in step 630, the status is set to a "shared write".

If it is determined that the read/write mask does not have any bit(s) set (e.g., a "NO") in step 620, then in step 640, the status is set to a "shared read".

If, in step 610, it is determined that the lookaside mask does not have more than one bit set (e.g., a "NO"), then in step 650 it is determined whether the read/write mask has any bits set.

If it is determined that the read/write mask has bit(s) set (e.g., a "YES") in step 650, then in step 660, the status is set to an "exclusive write".

If it is determined that the read/write mask does not have any bit(s) set (e.g., a "NO") in step 650, then in step 670, the status is set to an "exclusive read". Then, the process terminates.

Figure 7:
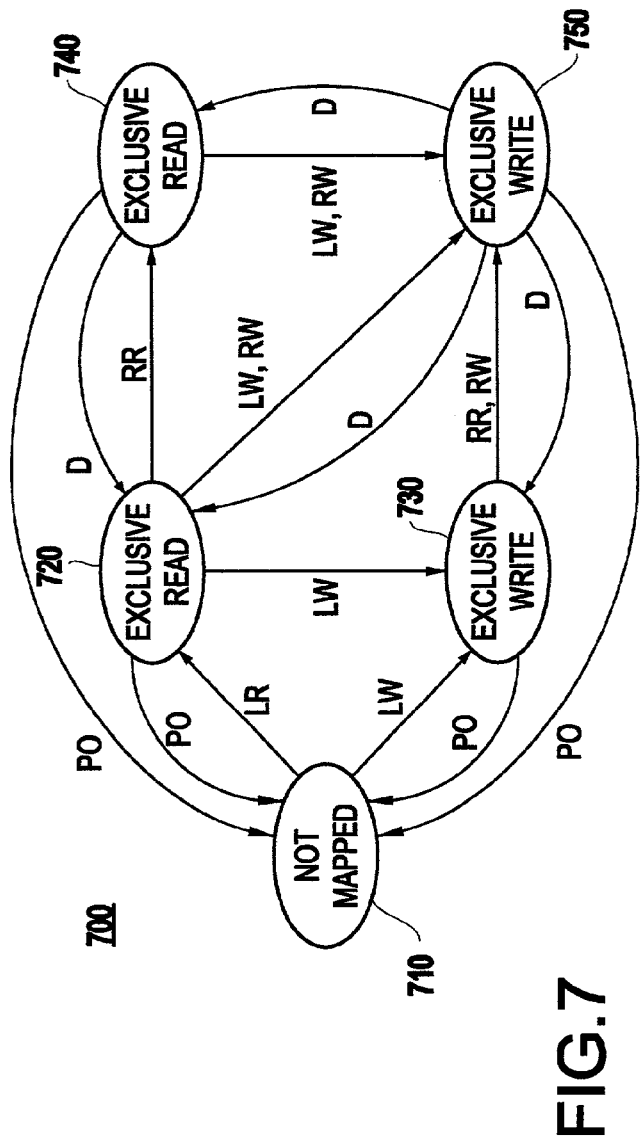
FIG. 7 illustrates a partial state machine 700 depicting transitions between shared memory states of a page.

The possible transitions between various shared memory states of a page is depicted in a partial state machine 700 of FIG. 7. The various memory states include "Not Mapped" 710, "Exclusive read" 720, "Exclusive write" 730, "Shared read" 740, and "Shared write" 750. In FIG. 7, "LR" is a local read, "LW" is a local write, "RR" is a remote read, "RW" is a remote write, "D" indicates a page dropped from some LLB, and "PO" indicates a page which is paged out. It is noted that pages can return to the "not mapped" state when they get paged out of the system.

Even though "shared write" is of most interest, FIG. 7 indicates that the other states are needed (e.g., important to note) as a way of getting to the "shared write" state. Thus, in the finite state machine 700, in order to get to the shared write state, the page may be in one of the other states and show a pathway to the shared write state. Hence, such other states are noted in the partial state machine 700.

As long as locations are not being written to, there is no problem with storage consistency. That is, storage consistency problems arise only when locations change their contents. It is assumed that at any given point in time, the execution of a given target processor is performed at exactly one host processor, although the exact host processor which performs the emulation may be different at different times.

For example, the simultaneous fetch of operands of a target instruction by two separate processors is disallowed. It is also assumed that, as is the case in common multiprogrammed systems, a context switch is associated with an implicit or explicit memory barrier. This ensures that as long as a location is not shared there are no consistency problems even if the actions of a target processor being emulated move from one host processor to another.

The above assumptions limit consistency problems to only those accesses that occur to pages in the "shared write" state. Thus, it suffices to follow every such access by an mbar instruction.

Figure 8:
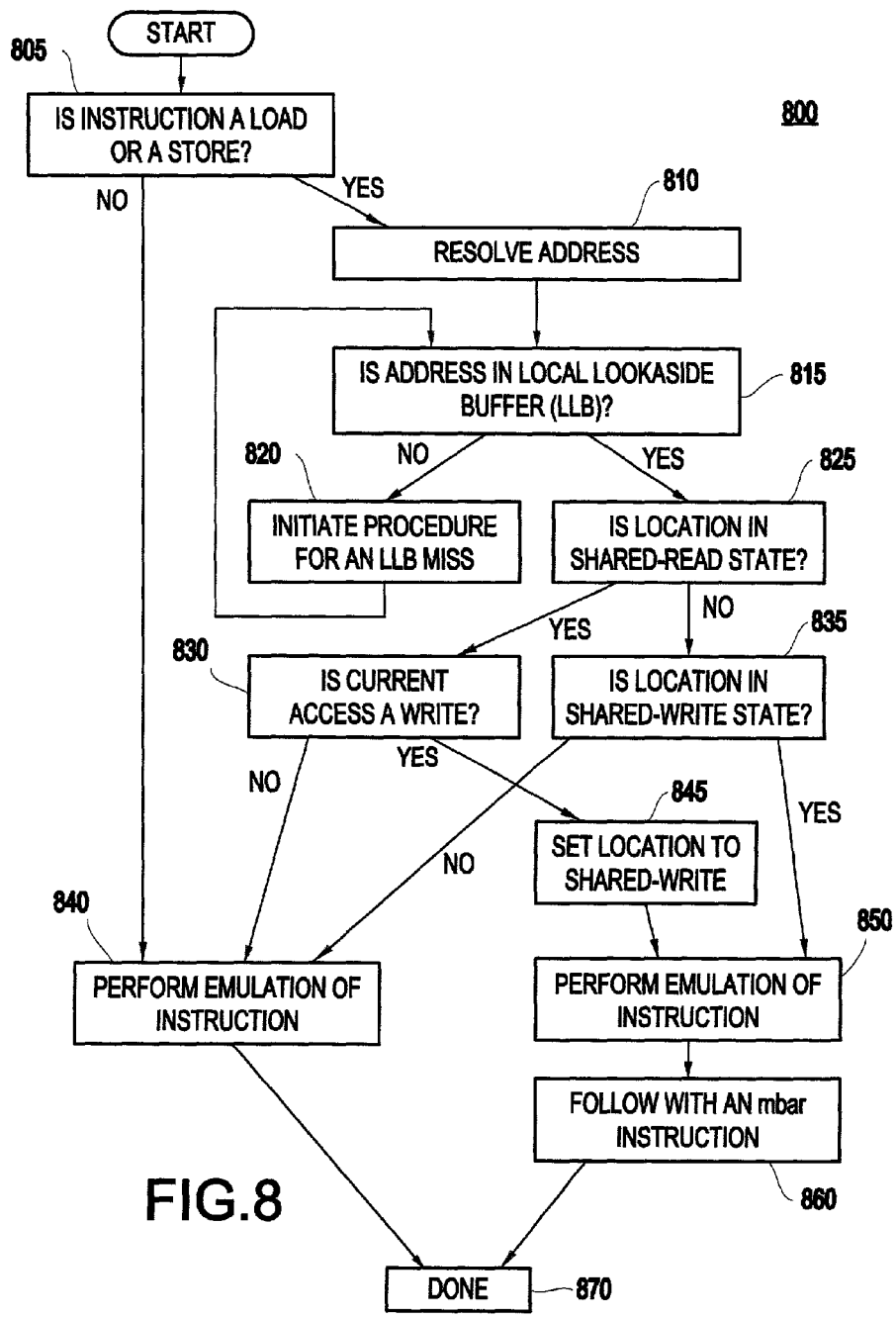
FIG. 8 illustrates an insertion process 800 of memory barrier instructions.

The procedure for ensuring sequential consistency when instructions are emulated one at a time is depicted in the flowchart of FIG. 8.

That is, FIG. 8 illustrates a method 800 of ensuring memory consistency, and more particularly to an insertion of the memory barrier instruction(s).

First, in step 805, it is determined whether the instruction is a load or a store. The invention is not necessarily concerned with other instructions as loads and stores are the primary ones affecting memory.

If it is determined that the instruction is not a load or a store (e.g., a "NO") in step 805, then the process proceeds to step 840 where the emulation of the instruction is performed, and then the process completes in step 870.

By the same token, if it is determined that the instruction is a load or a store (e.g., a "YES") in step 805, then the process proceeds to step 810 where the address is resolved. For example, a load/store instruction typically needs to add two quantities specified by the instruction in order to create the address. Both these quantities may either reside in specified registers, or one of the quantities is a field in the instruction itself. Resolution of the address means that the specified registers are ready with their contents, the addition has been performed, and the address translation mechanism has been invoked to convert the resulting sum into a real address. Hence, "resolving the address" would convert the virtual address to the real address (e.g., adding displacement, the virtual address translation, etc.).

In step 815, it is determined whether the address is in the local look-aside buffer (LLB). If the address is not in the LLB (e.g., a "NO"), then in step 820, procedures are initiated for an LLB miss (e.g., going to the global page table, etc.), and then the process loops back to step 815.

If the address is in the LLB (e.g., a "NO"), then in step 825, it is determined whether the location (e.g., the address) is in a shared-read state.

If, in step 825, it is determined that the location (e.g., the address) is in a shared-read state (e.g., a "YES"), then the process continues to step 830 in which it is determined whether the current address is a write. If it is not a write (e.g., a "NO"), then in step 840, the emulation of the instruction is performed and the process ends at step 870.

If, in step 830, the current access is determined to be a write (e.g., a "YES"), then in step 845, the location is set to a shared-write and in step 850 the emulation of the instruction is performed, and in step 860 the mbar instruction is placed thereat. The process then ends at step 870.

By the same token, if, in step 825, it is determined that the location (e.g., the address) is not in a shared-read state (e.g., a "NO"), then the process continues to step 835 in which it is determined whether the location (e.g., current address) is a shared-write.

If, in step 835, the location (address) is determined to be a shared-write state, then the process continues to step 850 where the emulation of the instruction is performed, and in step 860 the mbar instruction is placed thereat. The process then ends at step 870.

Thus, at steps 830/835, FIG. 8 essentially shows two possibilities where the address is a shared-write or the instruction becomes a shared-write depending upon where it is coming from. Again, as clear from FIG. 7, there are cases where an instruction which is not in the shared-write but can become a shared-write depending upon the pathway taken. For example, the "Exclusive Read" state 720 has a pathway to the "Shared Write" 750 state through a local write (LW) or a remote write (RW), as shown in FIG. 7. Hence, an mbar instruction is needed for shared-write instructions and instructions which may become a shared-write (e.g., a shared read 740 which becomes a write (local or remote), etc.). Again, in the shared read state 740, after the LW, RW is issued, then an mbar would be inserted. Other insertions of mbar would similarly be performed in cases which become a shared-write.

It may be possible, depending on the extent to which reordering is permitted between operations in the target system (relaxation of consistency), to reduce the number of memory barrier instructions further.

For example, in the System/390, it is not required to maintain ordering between the reading of operands of a single instruction. Hence, the mbar inserted between such reads in the emulation of a System/390 may be eliminated, thereby keeping the one after the second read.

In addition, because results written by an instruction are dependent on the operands read by the instruction, an mbar between the reading of operands and writing of results to memory in a 390 instruction can be eliminated, keeping the one after the write.

The discussion above assumes that the program order of emulated memory references is identical to the program order of the memory references that would have been performed by a target system. As discussed in several known examples (e.g., see U.S. Pat. No. 6,031,992, incorporated herein by reference), it is often possible to improve the emulation performance by considering groups of instructions to be translated together, and by performing optimizations on the translated group.

However, such optimizations tend to move instructions and reorder them in an attempt to find a favorable schedule for the group. Such a reordering could violate consistency requirements when executed in a multiprocessor environment, even if each of the emulated references is followed by an mbar instruction.

Referring to FIG. 9, the present invention now provides a scheme to maintain the required consistency in memory operations during emulation even in the presence of such reorderings. That is, FIG. 9 is directed to the situation where there is a group of instructions which are to be translated together, unlike the situation in FIG. 8 where the instructions were translated one-by-one. It is noted that a combination of the above situations could arise where the instructions could be translated as a group or one-by-one. Hence, in the situation of a group, one may have a combination of references, some of which are shared-writes and some of which are not.

For simplicity, it is assumed that the original sequence of instructions is a sequential stream of instructions with a single entry, but with multiple exits, each exit corresponding to a conditional branch out of the translated sequence.

It is also assumed that each instruction in this sequence is executed at most once (i.e., there are no branches that loop back to another instruction within the translation). Finally, it is assumed that the only memory references in the target instruction set are loads and stores between registers and memory. (This last assumption is not limiting in any way because more complex CISC-style instructions can be broken up into an appropriate sequence of instructions that include such load and store instructions.)

In FIG. 9, first, a stub code is attached at the beginning of the translations to save all registers of the target processor that are potentially changed by the instructions in the group. This checkpoint will be advantageous if the speculated translation of the group needs to be cancelled.

Next, each load and each store in the group of instructions are associated with two numbers including (a) the memory sequence number that indicates its position in the sequence of memory references, and (b) the store sequence number that indicates its position in the sequence of store reference subset.

Then, as shown in FIG. 9, a table 900 is constructed called the memory-order buffer (MOB), where each entry has four fields including whether it is a load or a store 910, an address 920 of the reference, a length 930 of the reference, and a value 930 associated with the reference (loaded or assumed value in the case of a load, and value to be stored into memory in the case of a store). Thus, looking at the number of load/stores in Table 900, three of the references are shared-writes, and two of the references are not.

The number of entries in the table is equal to the number of memory references in the sequence. FIG. 10 shows the target code 1010, the emulation code 1020, and the table 900 of FIG. 9. That is, the sequence number of a memory reference is an index into the table 900 as shown in the configuration 1000 of FIG. 10. Hence, shared memory access is being mapped to the MOB of FIG. 9

Figure 11:
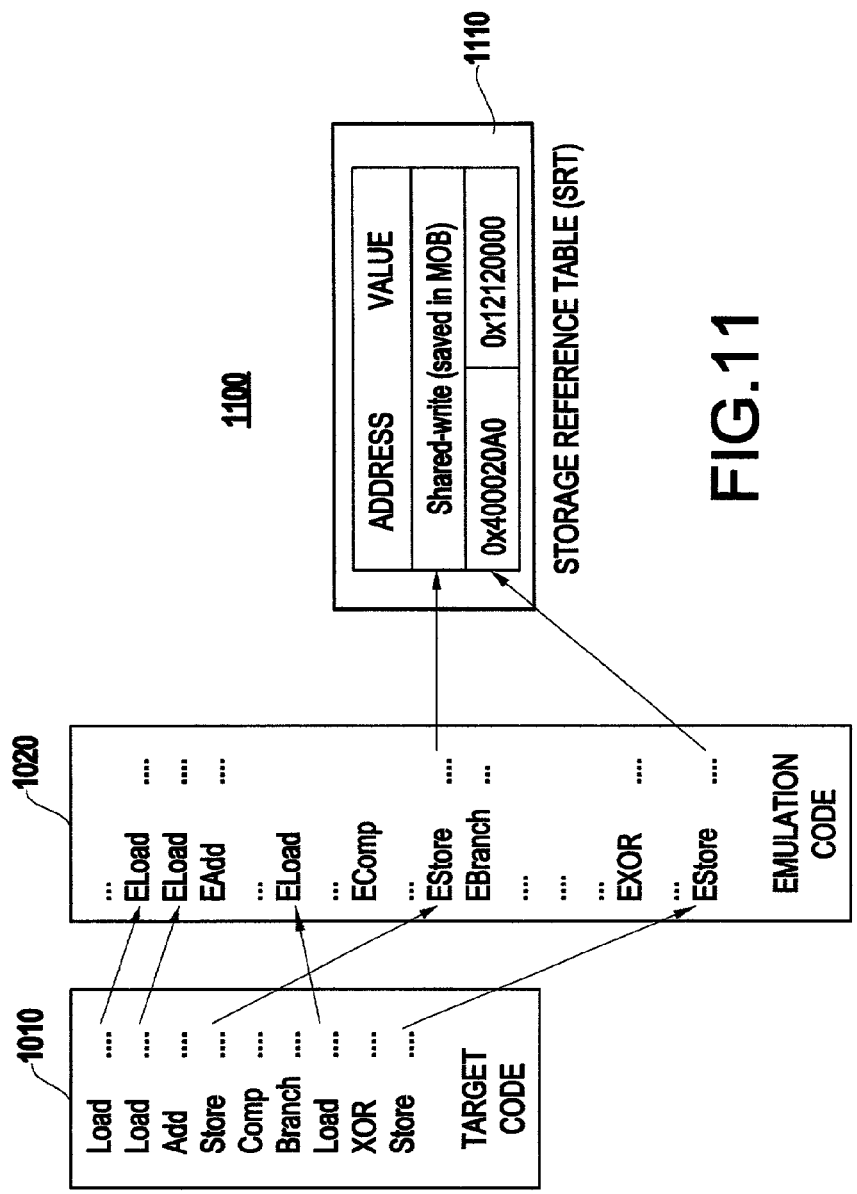
FIG. 11 illustrates a process 1100 of saving stores to a storage reference table (SRT) 1110 for recovery.

Additionally, as shown in the configuration 1100 of FIG. 11, a store recovery table (SRT) 1110 is constructed which contains as many entries as the number of store references, and where each entry contains two fields including an address field and an old-value field as shown in FIG. 11. Thus, in FIG. 11, stores are saved to the SRT 1110 for recovery. Table 1110 is useful, for example, when a problem arises.

For example, a problem may arise when someone else wrote something that another person has already read, and what should have been written was something "new" (not something "old"). As a result, all of the computations are wrong. In such a case, it would be helpful to set the values back. Moreover, some of the computations may actually have been stored to memory and it is desirable to reset those locations back to the previous values (e.g., back to their original contents). Hence, using Table 1110 is helpful since it stores addresses and values to fix the problem.

More specifically, the system senses a problem, and now must go back and restore the value to a time when it was correct. It performs such an operation by looping back and going through each of the stores one at a time (e.g., preferably performing the last one first after the last checkpoint and so forth) and determining the location and what the old value was. Then, the old value is inserted thereat.

Figure 12:
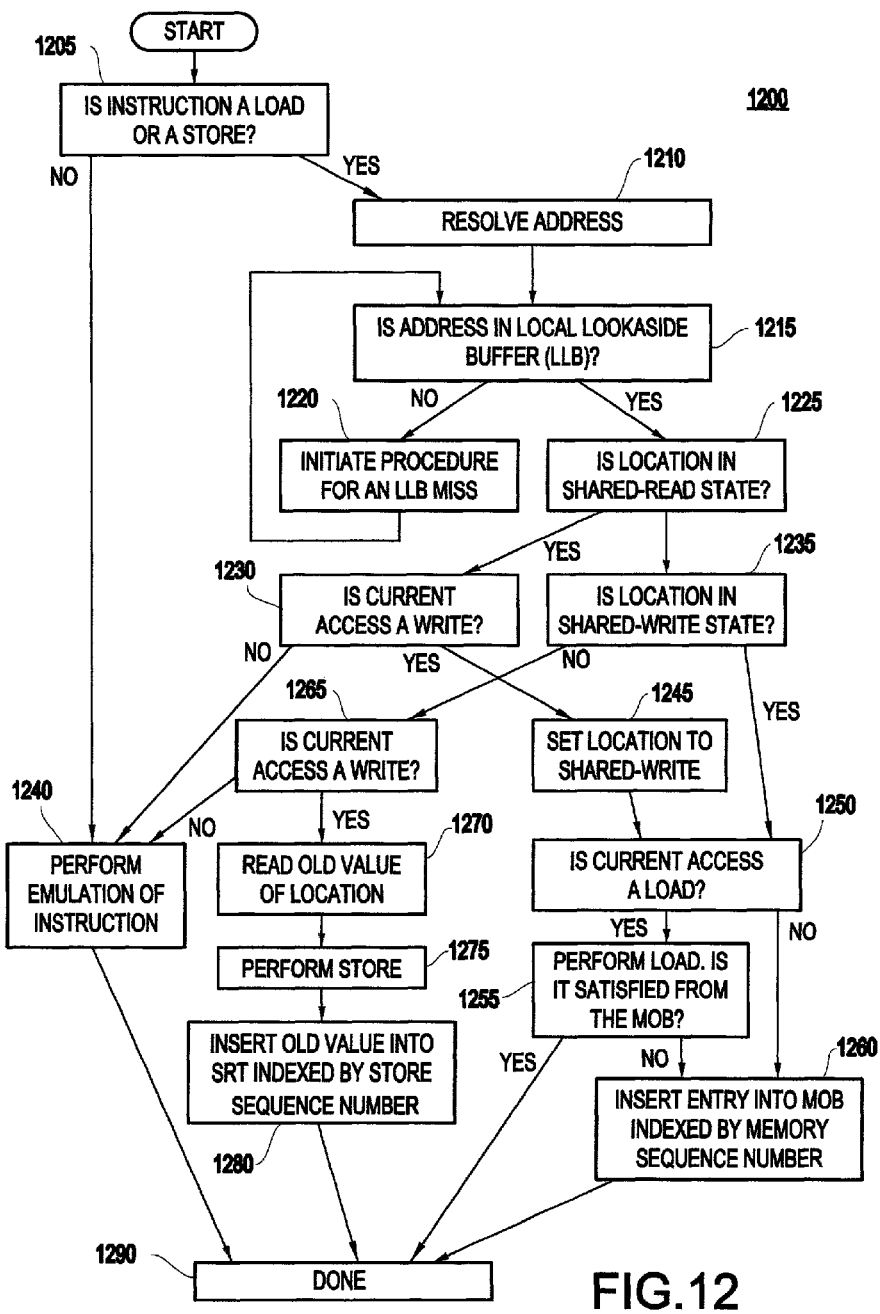
FIG. 12 illustrates a process 1200 of insertion of code for maintaining consistency with in a group of instructions using the MOB 900 and SRT 1110.

In the translation of each memory reference, code is included having the form shown in FIG. 12.

That is, in the method 1200 of FIG. 12, code is inserted for maintaining consistency within a group of instructions using the MOB 900 and the SRT 1110.

Specifically, first, in step 1205, it is determined whether the instruction is a load or a store. Again, the invention is not necessarily concerned with other instructions as loads and stores are the primary ones affecting memory.

If it is determined that the instruction is not a load or a store (e.g., a "NO") in step 1205, then the process proceeds to step 1240 where the emulation of the instruction is performed, and then the process completes in step 1290.

By the same token, if it is determined that the instruction is a load or a store (e.g., a "YES") in step 1205, then the process proceeds to step 1210 where the address is resolved. This step is similar to step 810 described above with regard to FIG. 8.

In step 1215, it is determined whether the address is in the local lookaside buffer (LLB). If the address is not in the LLB (e.g., a "NO"), then in step 1220, procedures are initiated for an LLB miss (e.g., going to the global page table, etc.), and then the process loops back to step 1215.

If the address is in the LLB (e.g., a "NO"), then in step 1225, it is determined whether the location (e.g., the address) is in a shared-read state.

If, in step 1225, it is determined that the location (e.g., the address) is in a shared-read state (e.g., a "YES"), then the process continues to step 1230 in which it is determined whether the current access is a write. If it is not a write (e.g., a "NO"), then in step 1240, the emulation of the instruction is performed and the process ends at step 1290.

If, in step 1230, the current access is determined to be a write (e.g., a "YES"), then in step 1245, the location is set to a shared-write and in step 1250 it is determined whether the current access is a load instruction.

If, in step 1250, it is determined that the current access is a load (e.g., a "YES"), then in step 1255 the load is performed, and it is determined whether the load is satisfied from the MOB (e.g., did the load/address occur earlier in the MOB?). If the load is satisfied, then the operation terminates at step 1270.

If the load is not satisfied from the MOB (e.g., a "NO") in step 1255, then the process continues to step 1260. In step 1260, the entry is inserted into the MOB indexed by the memory sequence number and the process terminates at step 1290

If, in step 1250, it is determined that the current access is not a load (e.g., a "NO"), then in step 1260 the entry is inserted into the MOB indexed by the memory sequence number and the process terminates at step 1290.

By the same token, returning to step 1235, if it is determined that the location (e.g., the address) is not in a shared-write state (e.g., a "NO"), then the process continues to step 1265 in which it is determined whether the access is a write.

If, in step 1265, the access is not a write (e.g., a "NO"), then the process continues to step 1240 where the emulation of the instruction is performed, and in step 1290 the process ends.

By the same token, if in step 1265, the access is determined to be a write (e.g., a "YES"), then the process continues to step 1270 at which time the old value of the location is read. Then, in step 1275, a store is performed and at step 1280 the old value is inserted into the SRT indexed by the store sequence number. Thereafter, in step 1290 the process terminates.

Thus, as shown in FIG. 12, this code determines whether or not the page corresponding to the referenced location is a "shared-write", and if it is, branches to a stub code.

This stub code indexes the MOB using the sequence number of the memory reference and records (a) whether it is a load or a store, and (b) the address of the reference. If the reference is a store, then it records also the value to be stored. If it is a load, then it performs the load and then records the value loaded.

A special case is made for a load to a shared-write location that has been the target of a previous store in the translation. In this case, the load should receive its contents from the MOB and the load itself is not recorded in the MOB.

If the reference is not to a "shared-write" location and if it is a store, then the old value of the location is read and recorded in the SRT before the store is performed.

It is noted that this stub code can be exposed to optimization and reordered along with the rest of the translation. At the end of the translation, another stub is added which checks to ensure that no other processor has changed values to "shared-write" locations accessed by this block.

Figure 13:
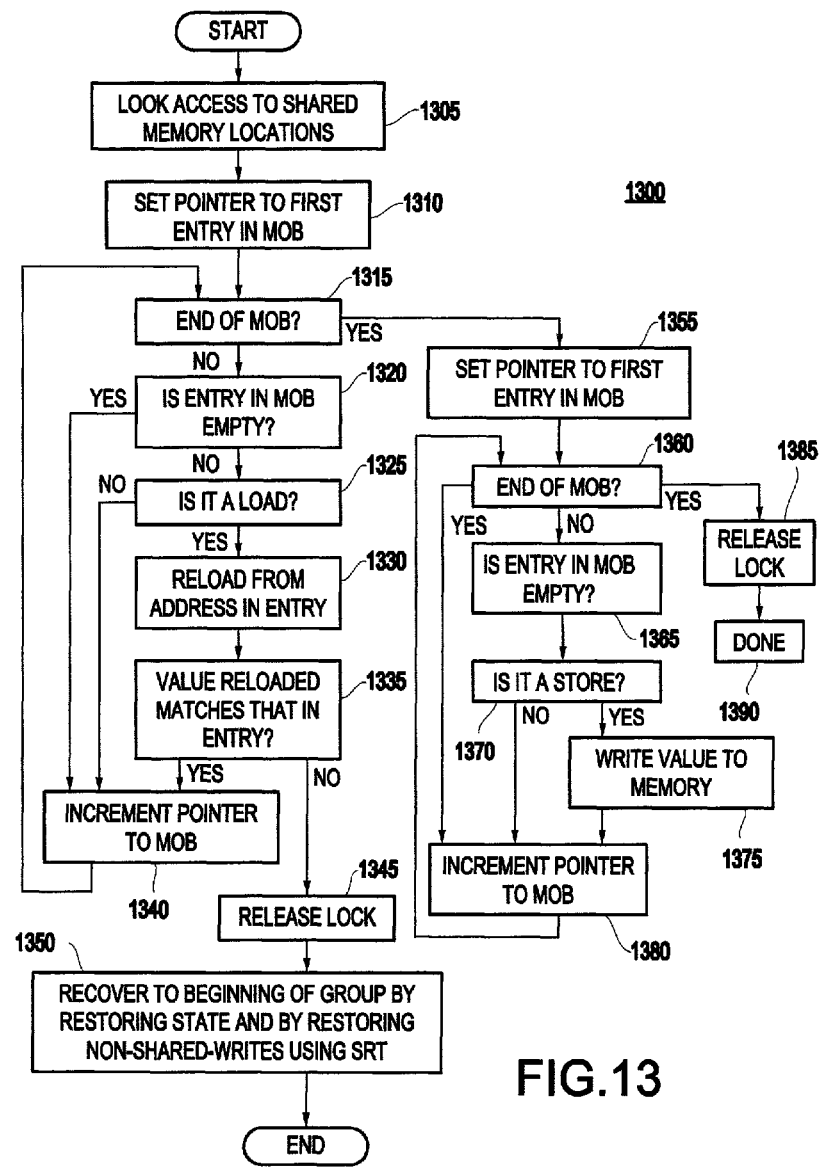
FIG. 13 illustrates a process 1300 for committing shared writes to memory at the end of group execution.
Figure 15:
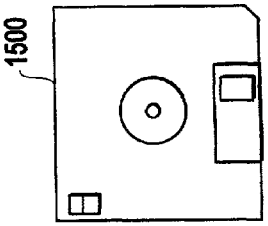
FIG. 15 illustrates a signal bearing medium 1500 (e.g., storage medium) for storing steps of a program of a method according to the present invention.

This is done as shown in FIG. 13, by first locking the shared memory locations from access by other processors. Each load location is reloaded and compared with the value stored in the corresponding MOB entry. If all reloads are found to be the same as the original loads, then it is safe to commit all stores from the MOB to their actual locations in memory.

If a mismatch occurs during the load validation process, the entire execution of the group is cancelled. This is effected by restoring all registers to their old state and by reversing the stores made to non-"shared-write" locations by undoing operations in the SRT. Once the system is brought back to its previously valid state, execution is reattempted. In order to avoid repeated execution-and-cancellation cycles within a group, re-execution may be done one-at-a-time using either the interpretation mode or a simple translation mode.

Hence, FIG. 13 illustrates the end of the computation, and thus, after translation of a group of instructions together and after the instructions have been executed, but before saving everything away to memory, it is desirable to ensure that, while performing the computation, nothing has changed. That is, changes may have been made by other processors during execution of the group, and the invention wants to ensure that such changes do not affect the values/instructions of the currently emulated processor.

Thus, looking now step-by-step at the process 1300 in FIG. 13 for committing shared writes to memory at the end of a group execution, first in step 1305, the access to shared memory locations are locked.

Then, in step 1310, the pointer is set to the first entry in the MOB, and in step 1315 it is determined if the end of the MOB has been reached. It is noted that the left side of the process after step 1315, is directed to the loads, whereas the right side of the process after step 1315, is directed to stores.

If "NO" in step 1315, then in step 1320, it is determined whether the entry in the MOB is empty. (If "YES" in step 1315, then the process proceeds to step 1340.).

Then, in step 1325, it is determined if the entry is a load. If "NO" in step 1325, then in step 1340, the pointer is incremented to the MOB and loops back to step 1315.

By the same token, if in step 1325 it is determined that the entry is a load (e.g., a "YES"), then in step 1330, the entry is reloaded from the address in the entry. In step 1335, it is determined whether the value reloaded matches that in the entry.

If "YES" in step 1335, then in step 1340 the pointer is incremented to the MOB and loops back to step 1315.

In "NO" in step 1335, then the lock is released in step 1345 and then in step 1350 recovery is performed to the beginning of the group by restoring the state and by restoring the non-shared writes using the SRT. At this point, the emulated program counter is reset to the beginning of the group, and the process of execution reattempted.

By the same token, if "YES" in step 1315, then the process goes to step 1355, at which the pointer is set to the first entry in the MOB. In step 1360, it is determined if the end of the MOB has been reached.

If "NO", then it is determined if the entry in the MOB is empty in step 1365. (If "YES" in step 1365, then the process proceeds to step 1380.).

Then, in step 1370, it is determined whether the entry in the MOB is a store. If the entry is a store (e.g., a "YES"), then the value is written to memory in step 1375 and the pointer is incremented in the MOB in step 1380 and then the process loops back to step 1360.

If a "NO" results in step 1370, then the process continues to step 1380 and then loops back to step 1360. If a "YES" in step 1360, then in step 1385, the lock is released and the process completes in step 1390.

Thus, as described above, the present invention can either go through instructions one-by-one, or can process groups of instructions by using the MOB and the SRT.

Figure 14:
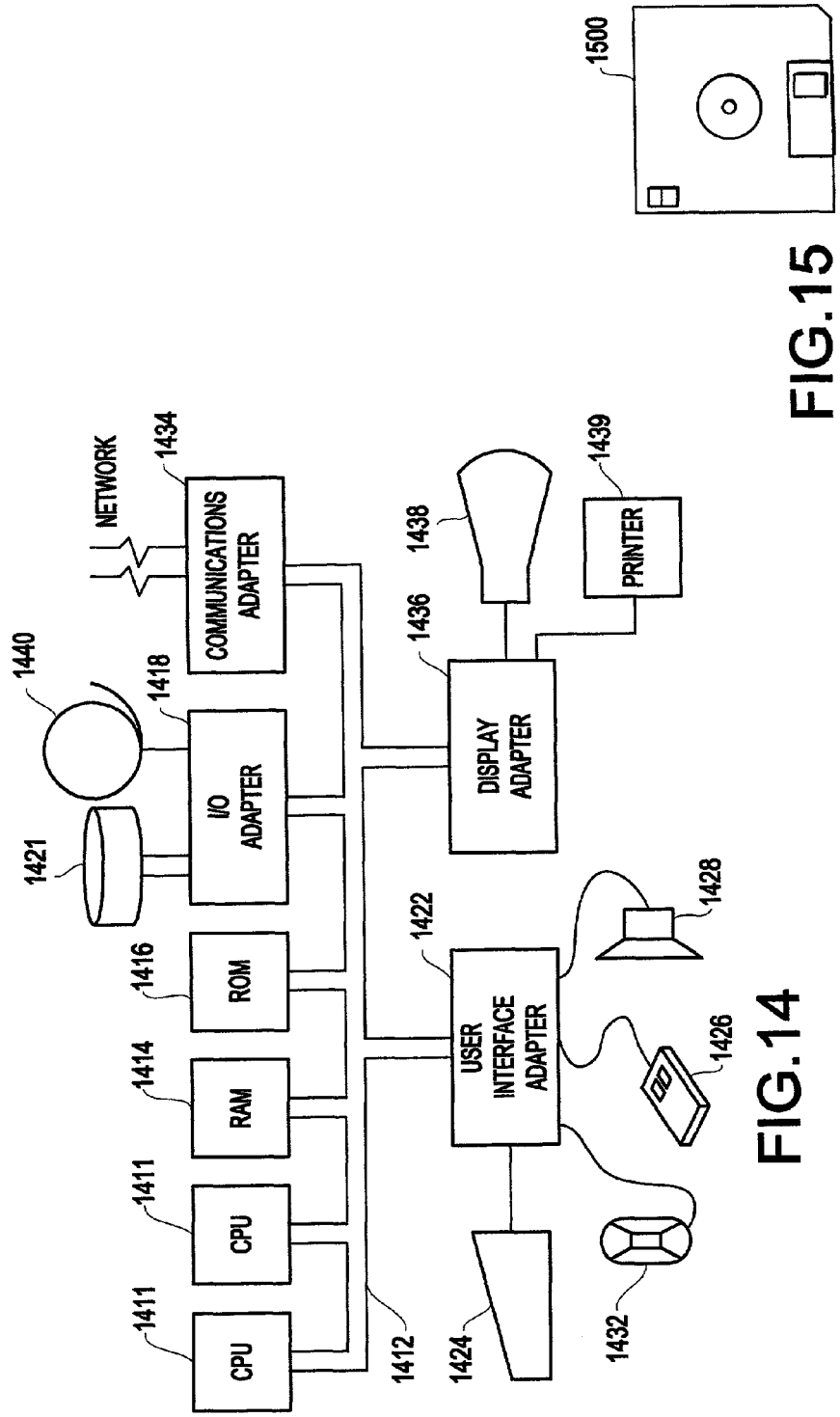
FIG. 14 illustrates an exemplary hardware/information handling system 1400 for incorporating the present invention therein.

FIG. 14 illustrates a typical hardware configuration of an information handling/computer system for use with the invention and which preferably has at least one processor or central processing unit (CPU) 1411.

The CPUs 1411 are interconnected via a system bus 1412 to a random access memory (RAM) 1414, read-only memory (ROM) 1416, input/output (I/O) adapter 1418 (for connecting peripheral devices such as disk units 1421 and tape drives 1440 to the bus 1412), user interface adapter 1422 (for connecting a keyboard 1424, mouse 1426, speaker 1428, microphone 1432, and/or other user interface device to the bus 1412), a communication adapter 1434 for connecting an information handling system to a data processing network, the Internet, an Intranet, a personal area network (PAN), etc., and a display adapter 1436 for connecting the bus 1412 to a display device 1438 and/or printer 1439 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 1411 and hardware above, to perform the method of the invention.

This signal-bearing media may include, for example, a RAM contained within the CPU 1411, as represented by the fast-access storage for example. Alternatively, the instructions may be contained in another signal-bearing media, such as a magnetic data storage diskette 1500 (FIG. 15), directly or indirectly accessible by the CPU 1411.

Whether contained in the diskette 1500, the computer/CPU 1411, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

With the unique and unobvious aspects of the present invention, emulation can be efficiently performed of a critical section by a plurality of processors being emulated on a multiprocessing system. That is, the invention can emulate the processors entering the critical sections when such sections are being emulated at the same time for different processors. Again, in the past, such a problem has not been encountered since emulation has been traditionally performed on a uniprocessor. In this regard, the present inventors were the first to recognize such a problem and come up with a unique and unobvious solution as described above. Further, the invention can ensure the above-mentioned memory consistency.

While the invention has been described in terms of several preferred embodiments, those skilled in the art will recognize that the invention can be practiced with modification within the spirit and scope of the appended claims.

Further, it is noted that, Applicant's intent is to encompass equivalents of all claim elements, even if amended later during prosecution.

What is claimed is:

1. A method of emulation in a multiprocessor system, said method comprising:

receiving, on a processor of a host multiprocessor system, an instruction to be emulated of a target multiprocessor system, said host multiprocessor system having a memory barrier (mbar) instruction that guarantees that all results of all memory operations before executing said mbar instruction have been registered by all processors in said host multiprocessor system before registering any results of any later instructions;

determining whether execution of said mbar instruction is required for said received instruction to be emulated before said received instruction is emulated; and selectively executing said mbar instruction, based on said determining, said selectively executing of said mbar instruction thereby permitting performing an emulation that is efficient, even in a condition in which the host multiprocessing system of said multiprocessor system supports a weak consistency model and the target multiprocessing system of the multiprocessor system supports a strong consistency model, by reason that said mbar instruction is executed for said received instruction only if said determining determines that said execution of said mbar instruction is necessary for emulating said received instruction.

2. The method of claim 1, said determining comprising:

determining a sharing status of a page, said determining comprising:

determining whether a look-aside mask in a lookup table has more than one bit set;

if it is determined that the look-aside mask has more than one bit set, then determining whether a read/write mask field in the lookup table has any bits set;

if it is determined that the read/write mask has any bits set, then setting the status to a "shared write"; and if it is determined that the read/write mask does not have any bits set, then setting the status to a "shared read".

3. The method of claim 2, wherein said determining a sharing status of a page further comprises:

if it is determined that the look-aside mask does not have more than one bit set, then determining whether the read/write mask has any bits set; and if it is determined that the read/write mask has bits set, then setting the status to an "exclusive write".

4. The method of claim 2, where said determining a sharing status of a page further comprises:

if it is determined that the read/write mask does not have any bits set, then setting the status to an "exclusive read".

5. The method of claim 1, further comprising:

providing a table maintained with sharing information about locations currently being referenced.

6. The method of claim 5, wherein said table includes a look-aside mask field and a read/write mask field, and includes information on whether a page is accessed by a processor in a read mode or in a write mode.

7. The method of claim 6, further comprising:

when a page is brought into the system, determining what state the page has, wherein when the page has a shared write state, then such a state is flagged.

8. The method of claim 6, wherein said table comprises a lookup table, said method further comprising:

determining a sharing status of a page, said determining comprising:

determining whether said look-aside mask in said lookup table has more than one bit set;

if it is determined that the look-aside mask has more than one bit set, then determining whether a read/write mask field in the table has any bits set;

if it is determined that the read/write mask has any bits set, then setting the status to a "shared write"; and if it is determined that the read/write mask does not have any bits set, then setting the status to a "shared read".

9. The method of claim 8, wherein said determining a sharing status of a page further comprises:

if it is determined that the look-aside mask does not have more than one bit set, then determining whether the read/write mask has any bits set;

if it is determined that the read/write mask has bits set, then setting the status to an "exclusive write";

if it is determined that the read/write mask does not have any bits set, then setting the status to an "exclusive read"; and ensuring a sequential consistency when instructions are emulated one at a time.

10. In a multiprocessor computing system, as executing an emulator for emulating a behavior of a target multiprocessor computing system, a method for emulating a memory consistency behavior of the target multiprocessor computing system, said method comprising:

selectively executing, prior to a memory action, a memory barrier instruction, the memory barrier instruction ensuring that results of memory actions performed before execution of the memory barrier instruction have been obtained by all processors in a host computing system, wherein said host computing system of said multiprocessor computing system initially determines whether said execution of said memory barrier instruction is necessary to ensure a consistency of results of said memory action, thereby ensuring an emulation that is efficient in even a worst-case emulation scenario in which said host computing system supports a weak consistency model and the target multiprocessor system of the multiprocessor computing system supports a strong consistency model, by reason that said mbar instruction is executed for an instruction received for emulation only if said determining results in determining that said mbar instruction execution is determined to be necessary for said received instruction.

11. The method of claim 10, wherein the memory barrier instruction executed prior to a memory action is executed immediately following access to a memory location identified as having a particular state.

12. The method of claim 11, wherein said particular state comprises a shared write state.

13. The method of claim 10, further including:

ensuring memory consistency, if instructions in a group of instructions from the target multiprocessor computing system are reordered when translated to the host.

14. A method for efficient emulation of multiprocessor memory consistency, said method comprising:

providing a memory barrier instruction which ensures that memory actions that have been performed before execution of the memory barrier instruction have been registered by all of the processors in a host computing system of a multiprocessor system; and selectively executing said memory barrier instruction when said multiprocessor host computing system emulates an instruction of a target multiprocessor system, as based upon a determining of whether execution of said memory barrier instruction is necessary for each received instruction being emulated, wherein the selective execution of the memory barrier instruction provides an emulation that is efficient even in a worst-case condition in which said host computing system supports a relaxed consistency model and said target multiprocessor system specifies a strong consistency model, by reason that said memory barrier instruction is executed only when determined necessary for said received instruction by said determining.

15. The method of claim 14, wherein the host computing system supports said relaxed consistency model with memory coherence.

16. The method of claim 14, wherein the memory barrier instruction guarantees that all memory operations after the barrier instruction are performed after all memory operations before the barrier instruction as registered by all processors.

17. The method of claim 14, further comprising:

providing a table maintained with sharing information about locations currently being referenced by said target computing system and said host computing system.

18. The method of claim 17, wherein said table includes a look-aside mask field and a read/write mask field, and includes information on whether a page is accessed by a processor in a read mode or in a write mode.

19. The method of claim 14, said determining comprising:

when a page is brought into the system, determining what state the page has, wherein when the page has a shared write state, then such a state is flagged.

20. The method of claim 14, said determining comprising:

determining a sharing status of a page, said determining comprising:

determining whether a look-aside mask in a lookup table has more than one bit set;

if it is determined that the look-aside mask has more than one bit set, then determining whether a read/write mask field in the table has any bits set;

if it is determined that the read/write mask has any bits set, then setting the status to a "shared write"; and if it is determined that the read/write mask does not have any bits set, then setting the status to a "shared read".

21. The method of claim 20, wherein said determining a sharing status of a page further comprises:

if it is determined that the look-aside mask does not have more than one bit set, then determining whether the read/write mask has any bits set; and if it is determined that the read/write mask has bits set, then setting the status to an "exclusive write".

22. The method of claim 21, wherein said determining further comprises:

if it is determined that the read/write mask does not have any bits set, then setting the status to an "exclusive read".

23. The method of claim 14, further comprising:

ensuring sequential consistency when instructions are emulated one at a time.

24. A non-transitory storage medium tangibly embodying a program of machine-readable instructions executable by a digital processing apparatus to perform a method of emulation in a multiprocessor system, said method comprising:

performing an emulation of instructions of a target multiprocessor system in a host multiprocessor system by initially determining whether a memory barrier instruction that ensures that results of memory actions performed before execution of the memory barrier instruction have been obtained by all processors in said host computing system is necessary for each instruction being emulated; and selectively executing said memory barrier instruction based on a result of said initially determining, said selectively executing said memory barrier instruction thereby providing a multiprocessor emulation that is efficient, even in a worst-case scenario in which the host multiprocessing system supports a weak consistency model and the target multiprocessing system supports a strong consistency model, by reason that said mbar instruction is executed for said received instruction only if said determining determines that said execution of said mbar instruction is necessary for emulating said received instruction.

* * * * *